United States Patent
Raissinia et al.

(10) Patent No.: US 7,230,909 B1
(45) Date of Patent: *Jun. 12, 2007

(54) EFFICIENT ACTIVITY RESUMPTION IN POINT TO MULTIPOINT SERVICE FLOW

(75) Inventors: Alireza Raissinia, Monte Sereno, CA (US); Vincent K. Jones, Redwood City, CA (US)

(73) Assignee: Cisco Technology, Inc., San Jose, CA (US)

( * ) Notice: Subject to any disclaimer, the term of this patent is extended or adjusted under 35 U.S.C. 154(b) by 800 days.

This patent is subject to a terminal disclaimer.

(21) Appl. No.: 09/822,906

(22) Filed: Mar. 29, 2001

(51) Int. Cl.
*H04J 11/00* (2006.01)

(52) U.S. Cl. .................. 370/206; 370/208; 370/210; 370/335; 375/260; 455/525

(58) Field of Classification Search ............... 370/203, 370/206, 208, 210, 477, 479, 480, 481, 345, 370/447; 455/510, 454, 525; 375/140; 725/111, 725/114, 138, 139; 348/14.02
See application file for complete search history.

(56) References Cited

U.S. PATENT DOCUMENTS

| | | | | |
|---|---|---|---|---|
| 6,005,876 A | * | 12/1999 | Cimini et al. ................ | 370/525 |
| 6,122,246 A | * | 9/2000 | Marchok et al. ............ | 370/208 |
| 6,169,744 B1 | * | 1/2001 | Grabelsky et al. .......... | 370/447 |
| 6,192,026 B1 | | 2/2001 | Pollack et al. .............. | 370/203 |
| 6,333,937 B1 | * | 12/2001 | Ryan .......................... | 370/468 |
| 6,430,148 B1 | * | 8/2002 | Ring ........................... | 370/208 |
| 6,459,703 B1 | * | 10/2002 | Grimwood et al. ......... | 370/442 |
| 6,473,418 B1 | * | 10/2002 | Laroia et al. ................ | 370/344 |
| 6,628,673 B1 | * | 9/2003 | McFarland et al. ......... | 370/481 |
| 6,657,949 B1 | * | 12/2003 | Jones et al. ................. | 370/205 |
| 6,847,635 B1 | * | 1/2005 | Beser ......................... | 270/352 |
| 2002/0101946 A1 | * | 8/2002 | Hartman et al. ............ | 375/376 |

OTHER PUBLICATIONS

N. Abramson "The Aloha System—Another alternative for computer communications," *Fall Joint Computer Conference, AFIPS Conference Proceedings*, AFIPS Press, Montvale, NJ, vol. 37, pp. 281-285. (1970).

A. Peled et al. "Frequency Domain Data Transmission Using Reduced Computational Complexity Algorithms," *IEEE International Conference on Acoustics, Speech and Signal Processing*—Apr. 9-11, Fairmont Hotel, Denver, CO., vol. 1 of 3, pp. 964-967. (1980).

(Continued)

*Primary Examiner*—Doris H. To
*Assistant Examiner*—Ian N. Moore
(74) *Attorney, Agent, or Firm*—Cindy Kaplan

(57) ABSTRACT

Orthogonal frequency division multiplexing (OFDM) is used to divide a single TDMA time slot into multiple non-contending access request opportunities that are reserved for particular subscriber units. An OFDM burst is divided into multiple tonesets where each toneset is allocated for access request by a particular subscriber unit. One application is providing an efficient mechanism for requesting resumption of periodic grants of time slots to support a voice call after a quiet period during which such time slots were temporarily unnecessary. A single access request slot can provide an opportunity for multiple subscriber units to request such a resumption.

23 Claims, 6 Drawing Sheets

OTHER PUBLICATIONS

K. Jacobsen et al. "A Discrete Multitone-based Network Protocol for Multipoint-to-point Digital Communications in the CATV Reverse Channel," *Canadian Cable Television Association (CCTA) Technical Papers*, pp. 121-139. (1995).

M. Karol et al. "An Efficient Demand-assignment Multiple Access Protocol for Wireless Packet (ATM) Networks," *ACM/Baltzer Wireless Networks*, vol. 1, No. 3, pp. 267-279. (1995).

C. Östberg et al. "Multiaccess Methods Based on OFDM," *Telia Research AB, Communication System Aurorum* 6 S-977, Luleå, Sweden, pp. 1-3.

A. Acampora "An Introduction to Broadband Networks," *Plenum Press,* New York, NY, pp. 53-55. (1994).

"Data-over-cable services interface specifications," Radio Frequency Interface Specification, Cable Television Laboratories, SP-RFIv1.1-106-001215. (1997).

* cited by examiner

EFFICIENT ACTIVITY RESUMPTION IN POINT TO MULTIPOINT SERVICE FLOW

STATEMENT OF RELATED APPLICATIONS

The present application is related to the subject matter of the following previously filed U.S. Patent Applications.

U.S. patent application Ser. No. 09/019,938, now issued as U.S. Pat. No. 6,192,026, entitled MEDIUM ACCESS CONTROL PROTOCOL FOR OFDM WIRELESS NETWORKS, filed on Feb. 6, 1998.

U.S. patent application Ser. No. 09/348,645, now issued as U.S. Pat. No. 6,788,950, entitled OPTIMAL USE OF REQUEST ACCESS TDMA SLOTS FOR AUTOMATIC LEVEL CONTROL, filed on Jul. 6, 1999.

U.S. patent application Ser. No. 09/348,718, now issued as U.S. Pat. No. 6,657,949, entitled, EFFICIENT REQUEST ACCESS FOR OFDM SYSTEMS, filed Jul. 6, 1999.

All of these related patent applications are incorporated herein by reference in their entirety for all purposes.

BACKGROUND OF THE INVENTION

The present invention relates to point to multipoint networks and more particularly to systems and methods for sharing available bandwidth efficiently among multiple users.

Point to multipoint networks are increasingly being deployed to provide end user access to the Internet. One example of a point to multipoint network is a data over cable network. In such a network, an existing CATV infrastructure previously used for distributing cable broadcast signals is modified to provide two-way data communication capability and Internet access. A cable head end acts as a central access point and exchanges information with subscriber units located at residences and/or businesses.

Another example of such a point to multipoint network is a fixed wireless access network. The architecture is similar, only now the central access point and multiple subscriber units exchange information using radio waves.

Either type of point to multipoint network may employ frequency division duplexing (FDD) where downstream transmissions (central access point to subscriber unit) use different frequency(s) than upstream transmissions (subscriber unit to central access point). The central access point is then the only entity that transmits on the available downstream frequencies.

Upstream bandwidth is, however, shared among multiple subscriber units. One typical scheme for sharing this upstream bandwidth is time division multiple access (TDMA) where the time domain is divided into multiple slots and only one subscriber unit may transmit successfully at a time. Access to individual time slots may be determined by either reservation where the central access point assigns time slots or by contention where subscriber units may attempt to transmit during a particular time slot without reservation. In the contention scheme, if there is a collision, the conflicting subscriber units wait a psuedo random interval before attempting retransmission. A combination of contention and reservation may also be used.

An example of a point to multipoint network protocol based on TDMA and combination of contention and reservation techniques is the DOCSIS v1.1 standard described in the Data-Over-Cable Interface Specifications, Radio Frequency Interface Specification SP-RFIv1.1-I06-001215 published by Cable Television Laboratories in 2000, incorporated herein by reference in its entirety and herein referred to as "DOCSIS v1.1 Specifications" or simply "DOCSIS v1.1". This DOCSIS specification is finding application in both the data over cable and wireless environments, although wireless environments may advantageously substitute for the physical layer portion of DOCSIS v1.1 to better handle the challenges presented by wireless channels.

The broadband Internet access provided by point to multipoint networks is increasingly viewed as a key enabler for streaming data services such as voice and video. If properly configured, the point to multipoint network can provide services such as local and long distance telephony as well as video on demand. The characteristics of this type of traffic makes special demands on the MAC (media access contention) layer protocol employed by the point to multipoint network. For example, the MAC layer portion of the DOCSIS 1.1 protocol makes special provisions for voice calls.

To support streaming applications, DOCSIS provides for multiple "service flows" where each service flow is a unidirectional flow of packets that is provided a particular quality of service. A voice call can be assigned a service flow which will then be handled by the MAC layer to provide minimal latency while maintaining optimal bandwidth allocation among multiple subscriber units. For example, a voice telephony call may be assigned to a service flow that is supported by an "unsolicited grant service." In an unsolicited grant service, a subscriber unit supporting a voice call need not request a reservation for each upstream slot that it needs to transmit voice data. Instead, the central access point gives the subscriber unit fixed sized grants at regular intervals. This is more efficient because the upstream bandwidth is then not cluttered with access requests for each and every slot needed to transmit the streaming data.

The use of this unsolicited grant service, however, may create another potential inefficiency. Voice calls are often full of quiet periods where the speaker is silent and there is no data to transmit. Many of the slots then allocated by the unsolicited grant service would be wasted. To address this concern and increase system efficiency, DOCSIS v1.1 also provides for an unsolicited grant service with activity detection where the subscriber unit can detect a pause in the voice data stream and requests suspension of the unsolicited grants. The slots thus freed up then become available for use by other traffic.

To resume upstream transmission of voice traffic after a quiet period, subscriber unit must again request access. To accommodate these access requests, the central access point provides periodic access request slots that are allocated exclusively to a particular subscriber unit that has an inactive service flow. This is in contrast to the access request technique that DOCSIS v1.1 provides for non-real time traffic in which subscriber units contend for access request slots. The motivation for providing exclusive allocations to access request slots rather than relying on a contention mechanism here is that if a request for resumption of the unsolicited grant service were to collide, data slots would not be made available soon enough to avoid loss of voice data. This effect would directly impact call quality.

A problem arises, however, in that these dedicated access request slots that are allocated to inactive service flows use bandwidth that is then unavailable for other services. Each inactive call supported by the network adds to this access request overhead since the subscriber units do not share these access request slots. What is needed is a more efficient activity resumption mechanism for service flows in a point to multipoint network.

SUMMARY OF THE INVENTION

According to one embodiment of the present invention, orthogonal frequency division multiplexing (OFDM) is used to divide a single TDMA time slot into multiple non-contending access request opportunities that are reserved for particular subscriber units. An OFDM burst is divided into multiple tonesets where each toneset is allocated for access request by a particular subscriber unit. One application is providing an efficient mechanism for requesting resumption of periodic grants of time slots to support a voice call after a quiet period during which such time slots were temporarily unnecessary. A single access request slot can provide an opportunity for multiple subscriber units to request such a resumption.

According a first aspect of the present invention, a method of operating a subscriber unit to request access to a common transmission medium includes: receiving an exclusive assignment to a toneset within a burst structure, transmitting a burst using tones specified by the assignment or leaving other tones in the burst available for use by other subscriber units, where the burst includes an access request burst.

According to a second aspect of the present invention, a method of operating a central access point to control access to a common transmission medium includes: sending an exclusive assignment to a toneset within a burst structure to a selected subscriber unit, receiving an access request burst that includes the toneset as transmitted from the selected subscriber unit, and in response to the access request burst, assigning at least one time slot to the selected subscriber unit for use of the common transmission medium.

Further understanding of the nature and advantages of the inventions herein may be realized by reference to the remaining portions of the specification and the attached drawings.

DESCRIPTION OF SPECIFIC EMBODIMENTS

Figure 1:
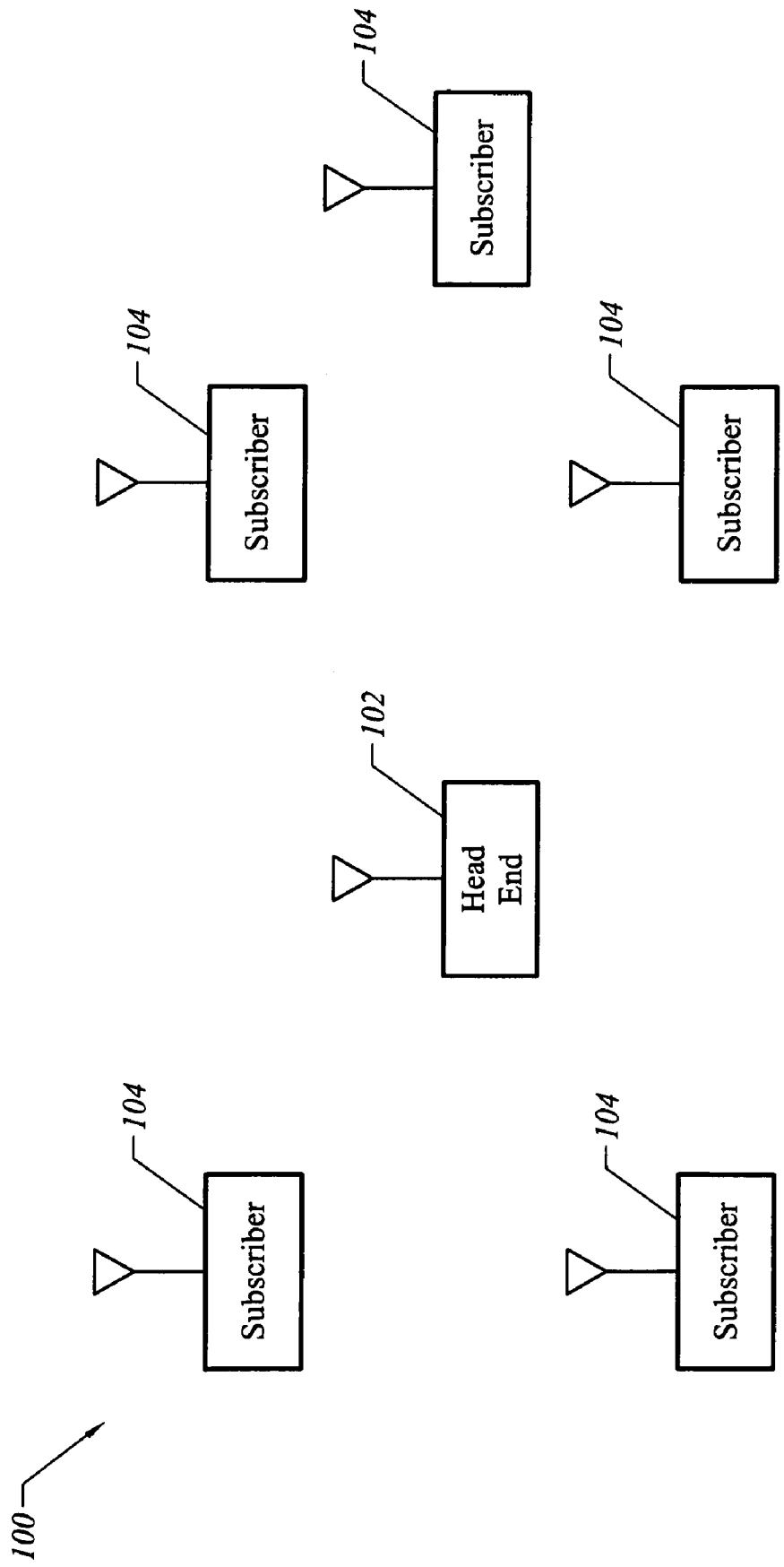
FIG. 1 depicts a point to multipoint network according to one embodiment of the present invention.

FIG. 1 depicts a point to multipoint wireless communication network 100 suitable for implementing one embodiment of the present invention. The present invention is, however, not limited to wireless networks. Network 100 includes a central access point or head end 102 and multiple subscriber units 104. All communication is typically either to or from central access point 102. Communication from central access point 102 to one or more subscriber units 104 herein referred to as downstream communication. Communication from any one of subscriber units 104 to central access point 102 is herein referred to as upstream communication. In one embodiment, different frequencies are allocated to upstream and downstream communication. This is referred to as frequency division duplexing (FDD). Alternatively, time division duplexing (TDD) may be employed where upstream and downstream communication share the same frequencies.

The DOCSIS v1.1 standard defines a MAC layer protocol that finds application in not only data over cable networks but also in wireless networks. DOCSIS v1.1 also defines physical layer protocols for data over cable networks. In wireless networks it is advantageous to combine a MAC layer along the lines of DOCSIS v1.1 with a physical layer system based on orthogonal frequency division multiplexing (OFDM). This type of system can better handle the challenges presented by wireless communication channels.

OFDM divides the available spectrum within a channel into narrow subchannels. In a given so-called "burst" each subchannel transmits one data symbol. Each subchannel, therefore, operates at a very low data rate compared to the channel as a whole. To achieve transmission on orthogonal subchannels, a burst of frequency domain symbols are converted to the time domain by an Inverse Fast Fourier Transform (IFFT) procedure. The individual frequency domain symbols are also referred to as tones. To assure that orthoganility is maintained in channels where signals may take multiple paths from the transmitter to the receiver, a cyclic prefix is added to the resulting time domain burst. A cyclic prefix is a duplicate of the last portion of the time domain burst that is appended to the burst's beginning. To assure orthoganality, the cyclic prefix should be as long as the duration of the impulse response of the channel. It is desirable to use OFDM in point to multipoint networks where multipath effects are a concern.

One desired application of a point to multipoint network is to support streaming real-time data such as Voice over IP (VoIP). Because supporting this type of application requires multiple levels of Quality of Service (QoS), DOCSIS v1.1 provides that traffic between central access point 102 and any one of subscriber units 104 may be divided among multiple service flows. The term service flow generally refers to a unidirectional flow of packets between central access point 102 and one of subscriber units 104. There should be at least one service flow downstream from central access point 102 to each subscriber unit and at least one service flow upstream from each subscriber unit 104. However, there may in fact be multiple service flows in either direction. Each service level has an associated Quality of Service. When central access point 102 assigns slots, it assigns the slots not only to the subscriber unit but also to a particular upstream service flow.

To support service flows carrying voice calls or other traffic with similar characteristics, DOCSIS v1.1 provides an unsolicited grant service with activity detection. This type of operation will be described in reference to a voice call and is described in greater detail on pp. 164–165 of the DOCSIS v1.1 Specifications. When the voice call is active, central access point 102 periodically sends grants downstream reserving slots for upstream transmission of voice call traffic. There is no need for the subscriber unit to repeatedly request these upstream slots, they are reserved automatically.

When there is a quiet period, and these reserved slots become unnecessary, an inactive period is entered and the regular granting of new slots is suspended. The DOCSIS v1.1 protocol provides that access request slots, however, are periodically reserved for individual service flows supporting inactive voice calls so that resumption of granting of data slots may be requested. The access request slots that are exclusively allocated to individual service flows for requesting resumption of data slot grants may consume a relatively large amount of system bandwidth. It is desirable to minimize the amount of bandwidth used in requesting resumption of data slot grant delivery.

According to one embodiment of the present invention OFDM is used to multiplex multiple access requests in the same MAC layer time slot. Within an OFDM burst structure, the tones available for carrying information are divided among multiple tonesets. During the inactive period, central access point 102 periodically grants a service flow operating on subscriber unit 104 a reserved access request opportunity. However, instead of giving this service flow exclusive use of the slot, central access point 102 allocates only one toneset to this service flow, freeing the other tonesets for other inactive service flows. This way multiple service flows can simultaneously request resumption of the active period. Systems and methods for using OFDM to share an access request slot among multiple subscriber units have been disclosed in U.S. patent application Ser. No. 09/019,938 and in U.S. patent application Ser. No. 09/348,718. According to the present invention, each toneset may be reserved exclusively for the use of an individual subscriber unit or service flow. Each toneset therefore may be viewed as representing a non-contention access request channel.

Figure 5:
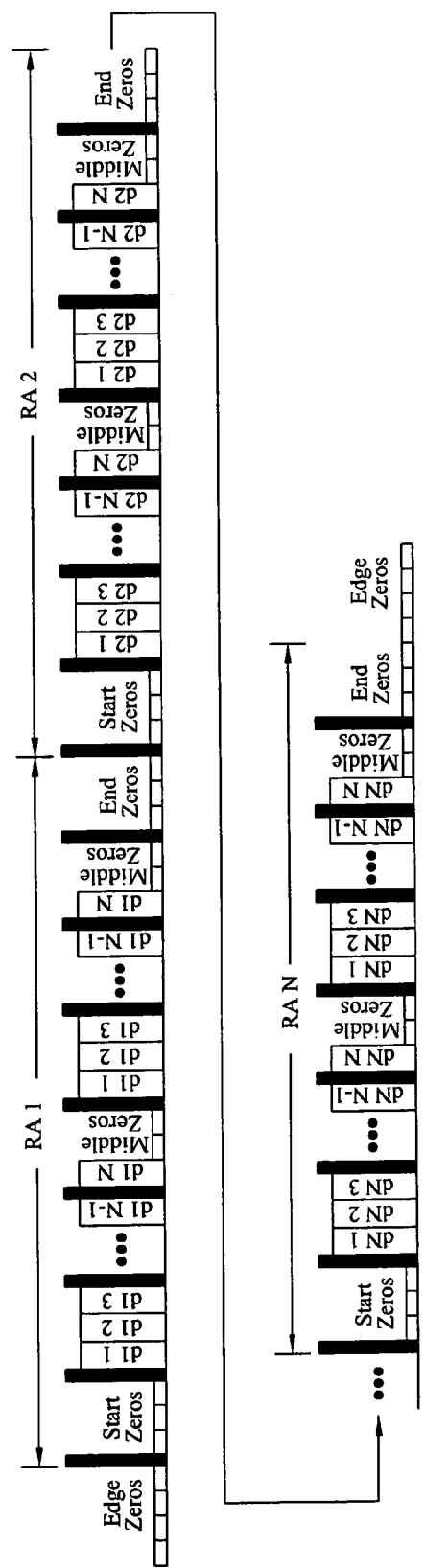
FIG. 5 depicts an access request slot according to one embodiment of the present invention.

FIG. 5 depicts the contents of an access request OFDM burst according to one embodiment of the present invention wherein each of multiple subscriber units are allocated contiguous subgroups of OFDM tones. An OFDM access request (RA) burst includes data tones, channel training tones having fixed values and being used for channel characterization at the receiver, and zero tones. FIG. 5 shows the arrangement of tonesets. At either end of the burst, there are $N_{edge}$ zero tones where $N_{edge}$ equals between $(N-v)/10$ and $(N-v)/20$ where N is the IFFT size and v is the number of training symbols to be included within the burst.

Besides the edge tones, the remaining tones are evenly divided into $N_{user}$RA tonesets of size $N_{ra}$. In FIG. 5, each toneset is denoted by RA x where x ranges from 1 to N. Each subscriber unit transmits using only one of the RA tonesets and sets the remaining tonesets to have zero value. When requesting access, each subscriber unit determines the toneset that it will use based on an assignment from the central access point. Each RA toneset contains $N_{tt}$ training tones that in the depicted example occupy every fourth tone starting with the first tone in the toneset.

Figure 2:
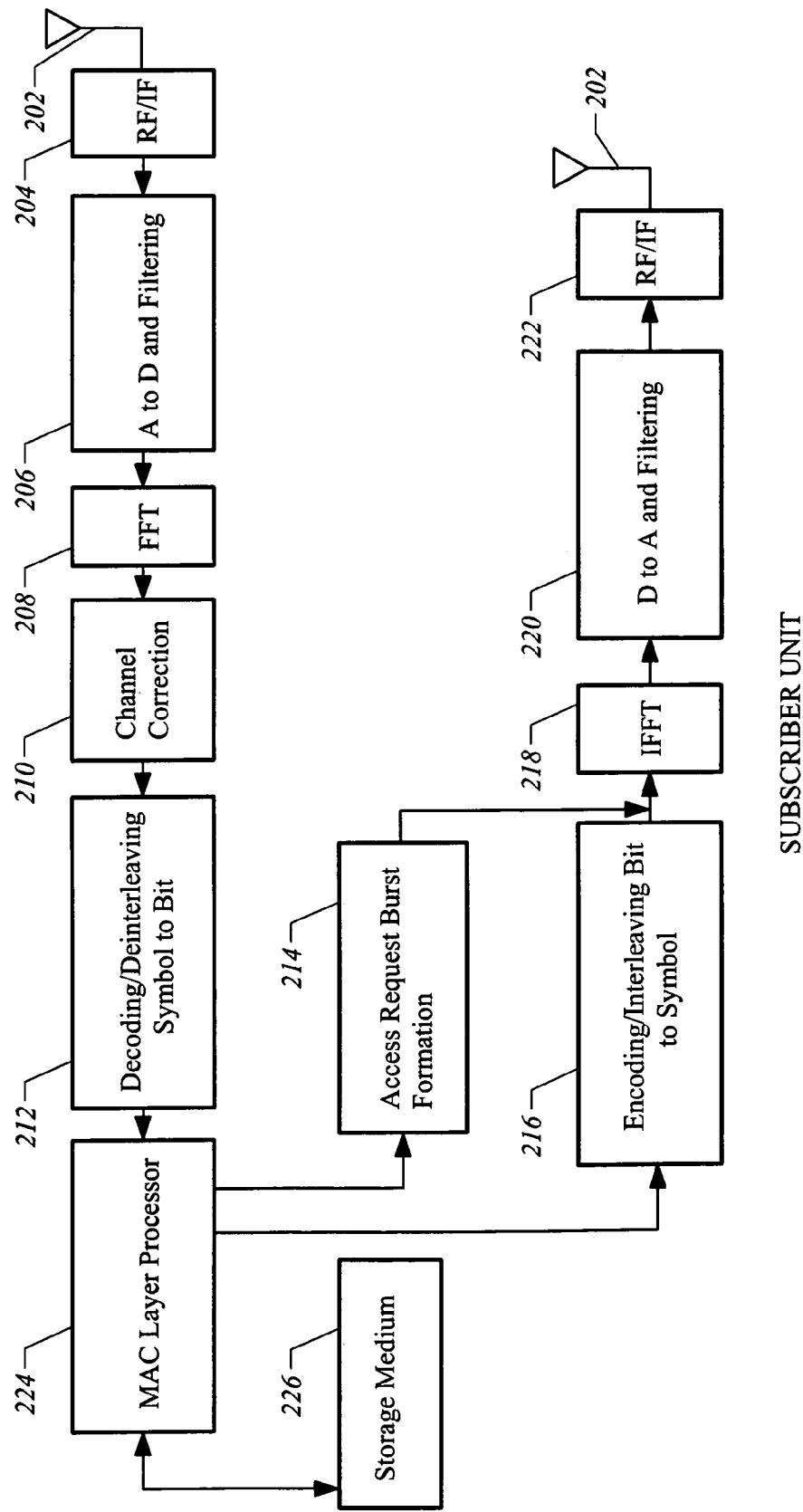
FIG. 2 depicts a subscriber unit according to one embodiment of the present invention.

FIG. 2 depicts a subscriber unit according to one embodiment of the present invention. OFDM signals from the central access point are picked up by an antenna 202 and fed to an RF/IF unit 204. RF/IF unit 204 filters and amplifies the signals picked up by antenna 202, converts them to an intermediate frequency or IF, and then performs further filtering and amplification at the IF. The IF signals are converted to base band. An analog to digital converter and filtering stage 206 converts the analog base band signal to a stream of digital samples and performs digital filtering.

An FFT stage 208 removes the cyclic prefix from successive time domain bursts and converts the burst to the frequency domain using the Fast Fourier Transform (FFT). In each burst, a portion of the frequency domain symbols or tones have predetermined values and are used to estimate the response of the communication channel. A channel correction stage 210 estimates and corrects for the channel response using, e.g. the techniques disclosed in U.S. patent application Ser. No. 09/234,929, now issued as U.S. Pat. No. 6,611,551, filed on Jan. 21, 1999, the contents of which are herein incorporated by reference in their entirety. A decoding/deinterleaving block 212 removes any error correcting codes and deinterleaves the corrected data stream and also converts symbols to data bits.

In one embodiment, multiple antennas are exploited to improve signal processing and/or interference. Blocks 208, 206, and 204 are duplicated for each antenna. The operation of blocks 210 and 212 may then follow, e.g., the technique described in U.S. patent application Ser. No. 09/234,629, now issued as U.S. Pat. No. 6,442,130, filed on Jan. 21, 1999, or U.S. patent application Ser. No. 09/410,945, now issued as U.S. Pat. No. 6,487,253, filed on Oct. 4, 1999, etc. the contents of both of these patent applications being incorporated by reference in their entirety.

An access request burst formation block 214 forms access request bursts as depicted in FIG. 5. The operation of access request burst formation block 214 is described in greater detail in U.S. patent application Ser. No. 09/348,718, now issued as U.S. Pat. No. 6,657,949. Prior to forming the access request burst, the access request data undergoes convolutional coding and bit interleaving within burst formation block 214. Other types of data to be transmitted upstream are encoded using error correction coding, interleaved, and converted to frequency domain symbols by a block 216. For either data bursts or access request bursts, an IFFT block 218 converts the frequency domain burst into the time domain using the Inverse Fast Fourier Transform (IFFT) and affixes the cyclic prefix. A digital to analog conversion and filtering block 220 digitally filters the time domain burst and converts it to analog form. The analog signals are converted to an intermediate frequency. An RF/IF block 222 filters and amplifies the IF signal, converts the IF signal to the RF frequency used for transmission and performs further amplification at the RF frequency. Preferably, transmission is via antenna 202 and the transmitter and receiver share antenna 202 by use of a diplexer (not shown).

A MAC layer processor 224 coordinates MAC layer operation as described in the DOCSIS v1.1 specification and herein. This includes requesting access when necessary for upstream transmission of individual data slots and for resumption of activity on a previously quiet service flow. MAC layer processor 224 also processes grants received from the central access point and times upstream transmissions accordingly. MAC layer processor 224 also acts an interface to higher layers.

MAC layer processor 224 may be implemented entirely in hardware but may also rely on instructions from a machine-readable medium for part of its operation. A computer readable storage medium 226 is depicted that may include program instructions, state information, etc. for performing any of the functions described herein. Examples of computer readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as read only memory devices (ROM) and random access memory (RAM). Another example of a computer-readable storage medium is a carrier wave traveling over an appropriate medium such as airwaves, optical lines, electric lines, etc. Examples of program instructions include both machine code such as produced by a compiler and files containing higher-level code that may be executed by the computer using an interpreter.

Figure 3:
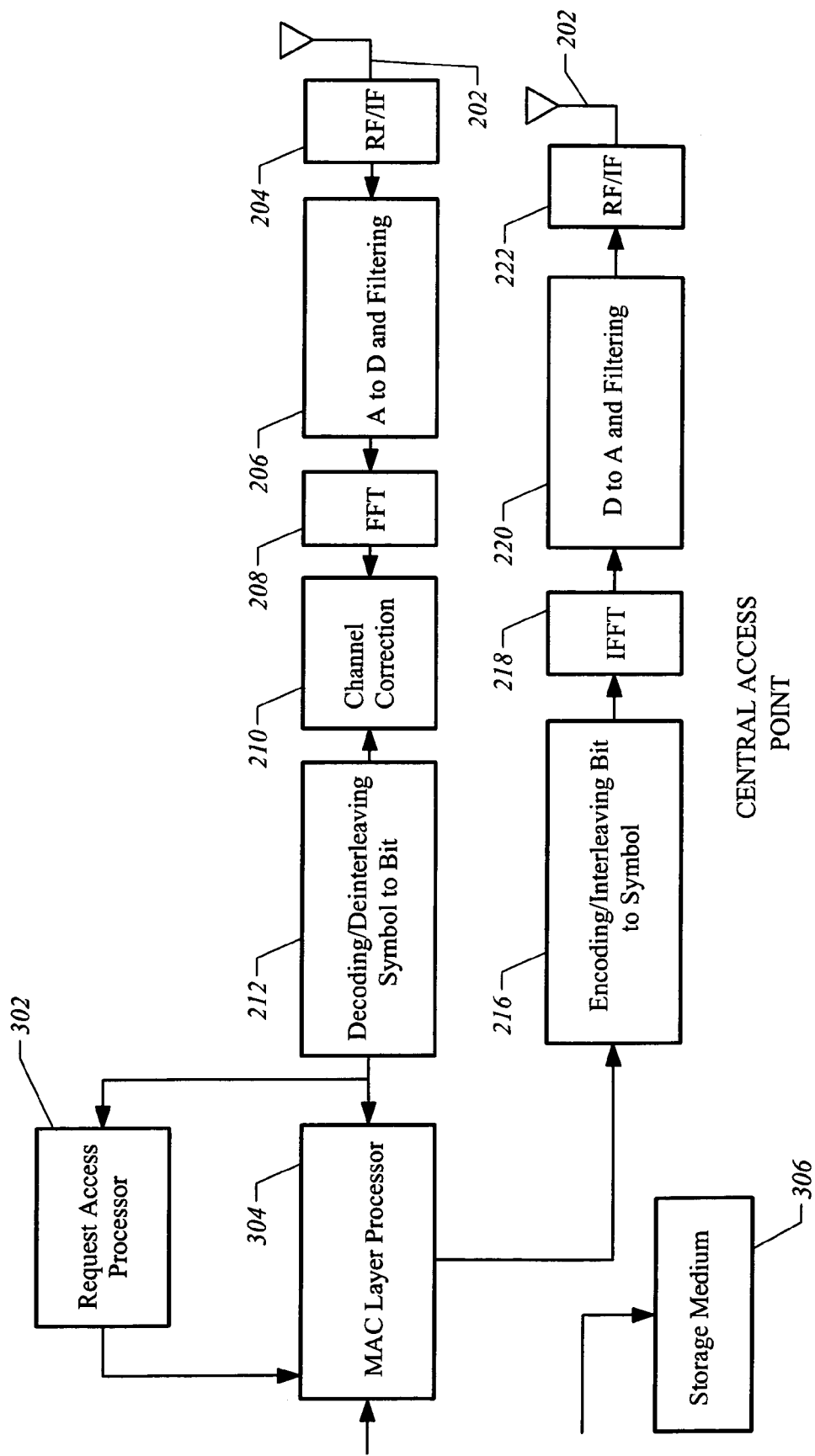
FIG. 3 depicts a central access point according to one embodiment of the present invention.

FIG. 3 depicts central access point 102 according to one embodiment of the present invention. Antenna 202, RF/IF block 204, analog to digital conversion and filtering stage 206, FFT stage 208, channel correction block 210, decoding and deinterleaving block 212, encoding and interleaving block 216, IFFT block 218, digital to analog conversion and filtering block 220, and RF/IF block 222 are depicted in FIG. 3 as they were in FIG. 2. The functions of these blocks are similar between the central access point and the subscriber units although the implementation may be different to address the different roles that central access point 102 and the subscriber units 104 play in the operation in point to multipoint network 100. A request access processor 302 is capable of processing the burst structure depicted in FIG. 2 and determining which subscriber units have requested access during a given access request slot.

A MAC layer processor 304 implements the central access point portion of the MAC layer functionality specified by DOCSIS v1.1 as well as the access request functionality described herein. MAC layer processor 304 processes access requests, grants transmission slots to individual upstream service flows, acts as the interface to entities implementing higher layer protocols, etc. A computer readable storage medium 306 may fill a role similar to that of storage medium 226 in FIG. 2.

Figure 4:
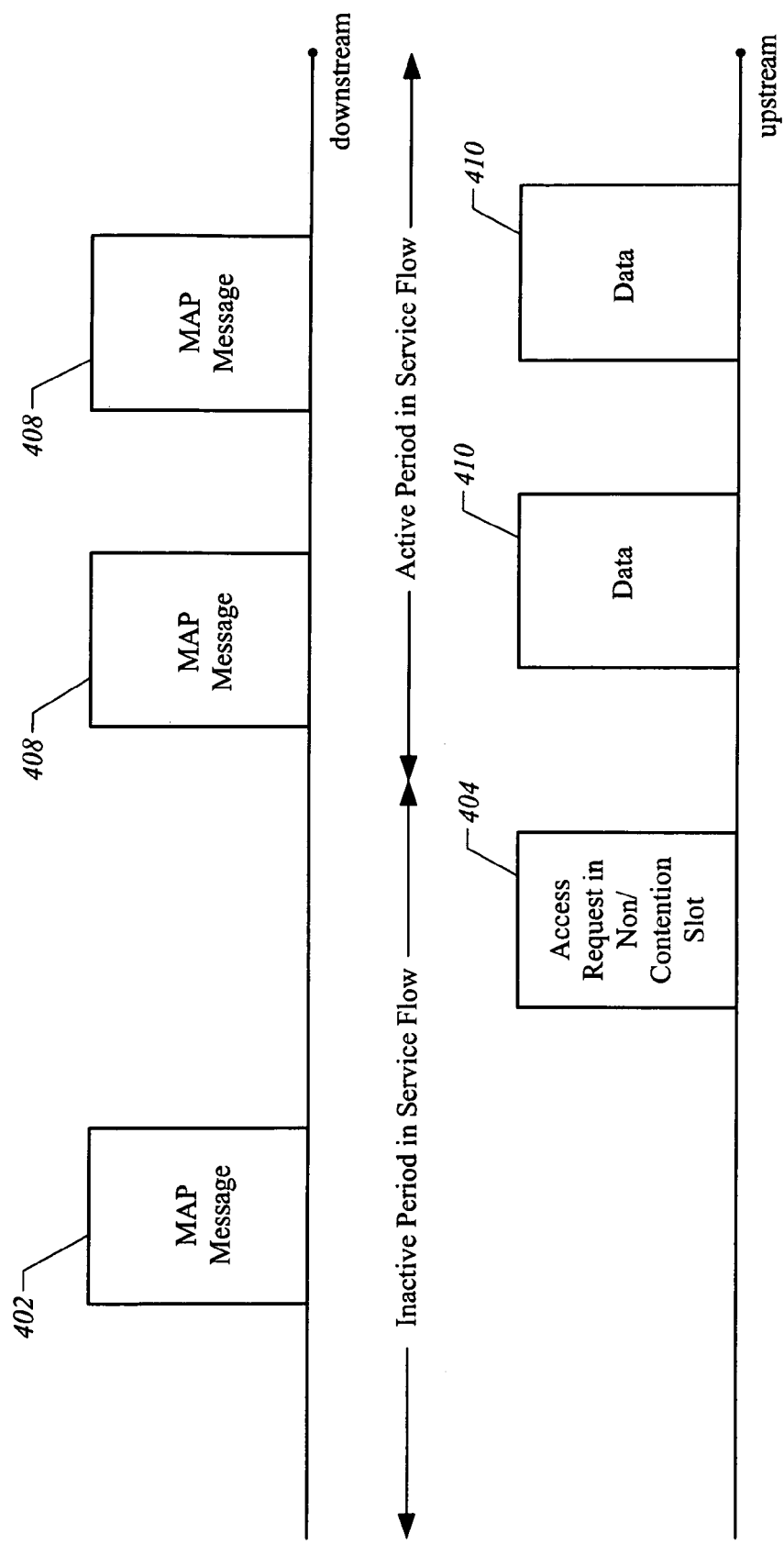
FIG. 4 depicts message traffic to support resumption of activity on an inactive service flow according to one embodiment of the present invention.
Figure 6:
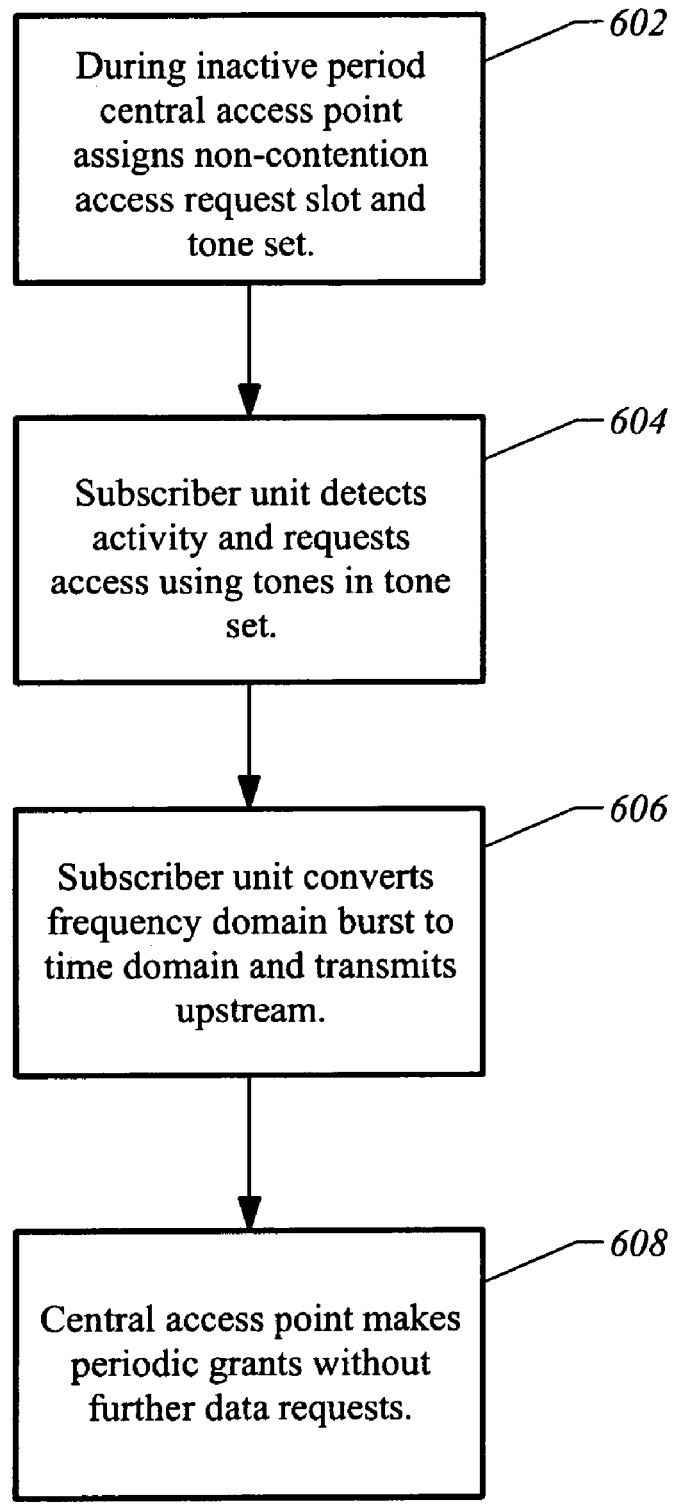
FIG. 6 is a flowchart describing steps of operating a non-contention access request channel within a shared burst according to one embodiment of the present invention.

Access request operation according to the present invention will be described with reference to FIG. 4 and FIG. 6. FIG. 4 depicts various upstream and downstream time slots used in terminating an inactive period of a service flow according to one embodiment of the present invention. FIG. 6 depicts such operation in flow chart form.

The discussion assumes that a service flow has been set up. The service flow employs the unsolicited grant service with activity detection described at pp. 164–165 of the DOCSIS v1.1 Specifications. In FIG. 4 the upper horizontal axis depicts downstream transmissions from central access point 102 to the subscriber units 104. The bottom horizontal axis depicts upstream transmissions by a particular subscriber unit 104. It should be noted that in FIG. 4 the width of individual time slots and the spacing between the time slots are not drawn to scale.

At the left edge of the diagram of FIG. 4, a particular service flow that exploits the unsolicited grant service with activity detection is in an inactive period. A MAP message 402, transmitted downstream at step 602, provides a schedule of upstream transmissions as specified by the DOCSIS v1.1 Specifications at pp. 133–139. MAP message 402 includes an information element that schedules an access request slot for use by the interrupted service flow. According to the present invention, this information element specifies not only the time period of the access request slot but also a particular toneset to be used by the subscriber unit in requesting resumption of regular grants of data slots to support the service flow. The MAP message 402 may allocate other tonesets of the same access request slot to other service flows. Each toneset is reserved for a single inactive service flow. It is possible that more than one inactive service flow will be operated by the same subscriber unit.

At step 604, the subscriber unit having the inactive service flow detects activity, i.e., new data that should be transmitted using the service flow, and transmits an access request using the toneset reserved for it. This is access request message 404. The access request burst includes the assigned toneset in, e.g., the structure of FIG. 2. Tones outside the assigned toneset are given zero values and left for use by other service flows. The access request burst that has been formed in this way is converted by subscriber unit 104 to the time domain and transmitted upstream to central access point 102 at step 606. In response, at step 608, central access point 102 resumes regular data slot grants to this newly reactivated service flow in MAP messages 408. In response to MAP messages 408, subscriber unit 104 transmits service flow data upstream during the specified slots 410.

The systems and methods described herein provide great advantages in supporting streaming services such as voice telephony over point to multipoint. By economizing on bandwidth used in resuming service flow activity, more bandwidth is made available for subscriber data.

It is understood that the examples and embodiments that are described herein are for illustrative purposes only and various modifications or changes in light thereof will be suggested to persons skilled in the art and are to be included within the spirit or purview of this application and scope of the appended claims and their full scope of equivalents. For example, the present invention may be applied to systems exploiting MAC protocols other than DOCSIS. It is also not necessary for OFDM to be used for downstream transmission or for upstream transmission of data. All publications, patents, and patent applications cited herein are hereby incorporated by reference.

The invention claimed is:

1. A method of operating a subscriber unit to request access to a common transmission medium, said method comprising:
   receiving an exclusive assignment to a toneset within an OFDM burst structure in response to detection of an inactive period at said subscriber unit and prior to transmitting an access request, wherein said toneset represents a non-contention access request channel;
   identifying termination of said inactive period;
   transmitting an OFDM burst using tones specified by said exclusive assignment while leaving other tones in said OFDM burst available for use by other subscriber units, wherein said OFDM burst comprises said access request; and
   transmitting data over said common transmission medium using an assigned time slot.

2. The method of claim 1 further comprising:
   converting said OFDM burst into the time domain prior to transmitting said OFDM burst.

3. The method of claim 1 wherein transmitting said OFDM burst signals termination of a silent period in a voice call.

4. The method of claim 1 wherein transmitting said OFDM burst comprises transmitting said burst in a time slot determined by a DOCSIS (Data-Over-Cable Service Interface Specification) MAC layer protocol.

5. A method of operating a central access point to control access to a common transmission medium, said method comprising:
   detecting an inactive period at a selected subscriber unit;
   sending an exclusive assignment to a toneset within an OFDM burst structure to the selected subscriber unit in response to detection of said inactive period at the selected subscriber unit and prior to receiving an access request from the selected subscriber unit, wherein said toneset represents a non-contention access request channel;
   receiving an OFDM burst that includes said toneset as transmitted from said selected subscriber unit, said OFDM burst comprising said access request; and
   in response to said access request OFDM burst, assigning at least one time slot to said selected subscriber unit for use of said common transmission medium.

6. The method of claim 5 wherein said access request OFDM burst includes access request information from subscriber units other than said selected subscriber unit.

7. The method of claim 6 wherein said toneset transmitted from said selected subscriber unit signals an end to a silent period in a voice call.

8. The method of claim 5 wherein receiving said access request OFDM burst comprises receiving said access request burst within a time slot determined by a DOCSIS MAC layer protocol.

9. Apparatus for operating a subscriber unit to request access to a common transmission medium, said apparatus comprising:
- a MAC layer processor that receives an exclusive assignment to a toneset within an OFDM burst structure in response to detection of an inactive period and prior to submitting an access request, wherein said toneset represents a non-contention access request channel; and
- an access request burst formation block that transmits an OFDM burst using tones specified by said assignment while leaving other tones in said OFDM burst available for use by other subscriber units; and wherein
- said OFDM burst comprises said access request.

10. The apparatus of claim 9 further comprising:
- a transform block that converts said OFDM burst into the time domain.

11. The apparatus of claim 9 wherein transmitting said OFDM burst signals termination of a silent period in a voice call.

12. The apparatus of claim 9 wherein said access request burst formation block transmits said OFDM burst in an exclusively reserved time slot determined by a DOCSIS MAC layer protocol.

13. Apparatus for operating a central access point to control access to a common transmission medium, said apparatus comprising:
- a MAC layer processor that sends an exclusive assignment to a toneset within an OFDM burst structure to a selected subscriber unit in response to detection of an inactive period at the selected subscriber unit and prior to receiving an access request from the selected subscriber unit, wherein said toneset represents a non-contention access request channel; and
- a request access processor that receives OFDM burst that includes said toneset as transmitted from said selected subscriber unit, said OFDM burst comprising said access request; and
- wherein in response to said access request OFDM burst, said MAC layer processor assigns at least one time slot to said selected subscriber unit for use of said common transmission medium.

14. The apparatus of claim 13 wherein said access request OFDM burst includes access request information from subscriber units other than said selected subscriber unit.

15. The apparatus of claim 14 wherein said toneset transmitted from said selected subscriber unit signals an end to a silent period in a voice call.

16. The apparatus of claim 13 wherein said request access processor receives said access request OFDM burst within a time slot determined by a DOCSIS MAC layer protocol.

17. Apparatus for operating a subscriber unit to request access to a common transmission medium, said apparatus comprising:
- means for receiving an exclusive assignment to a toneset within an OFDM burst structure in response to detection of an inactive period at the subscriber unit and prior to transmitting an access request, wherein said toneset represents a non-contention access request channel;
- means for transmitting an OFDM burst using tones specified by said assignment while leaving other tones in said OFDM burst available for use by other subscriber units; and wherein
- said OFDM burst comprises said access request.

18. Apparatus for operating a central access point to control access to a common transmission medium, said apparatus comprising:
- means for sending an exclusive assignment to a toneset within an OFDM burst structure to a selected subscriber unit in response to detection of an inactive period at the selected subscriber unit and prior to receiving an access request from the selected subscriber unit, wherein said toneset represents a non-contention access request channel;
- means for receiving an OFDM burst that includes said toneset as transmitted from said selected subscriber unit, said OFDM burst comprising said access request; and
- means for, in response to said access request OFDM burst, assigning at least one time slot to said selected subscriber unit for use of said common transmission medium.

19. The method of claim 1 wherein the inactive period is a silent period in a voice call.

20. The method of claim 19 wherein transmitting said OFDM burst comprises transmitting said OFDM burst in response to detecting activity.

21. The method of claim 1 further comprising receiving data slot grants in response to transmitting said OFDM burst.

22. The method of claim 1 wherein said toneset comprises a predefined number of tones.

23. The method of claim 1 wherein said exclusive assignment applies to said inactive period and is removed upon transmittal of said OFDM burst.

* * * * *